July 17, 1956
J. GERDES
2,755,102
FOOT SCRAPER FOR A VEHICLE
Filed July 8, 1955
2 Sheets-Sheet 1
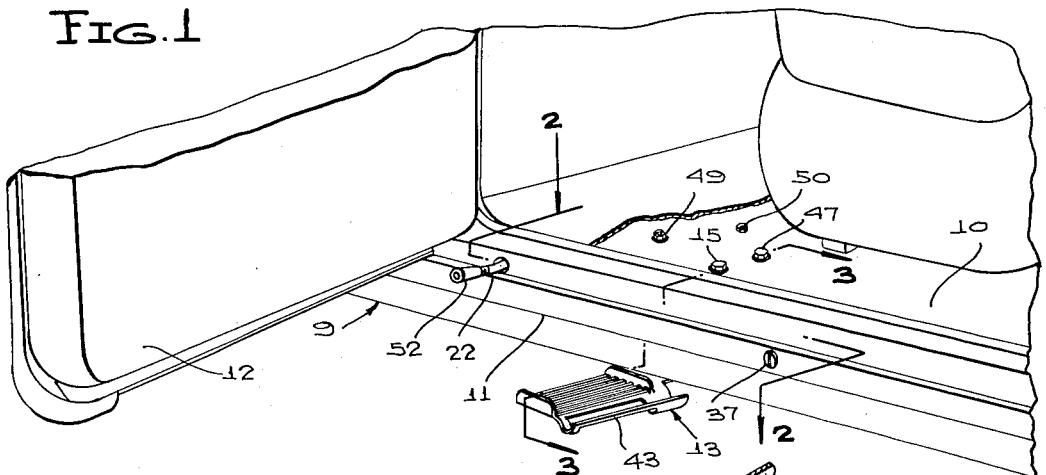
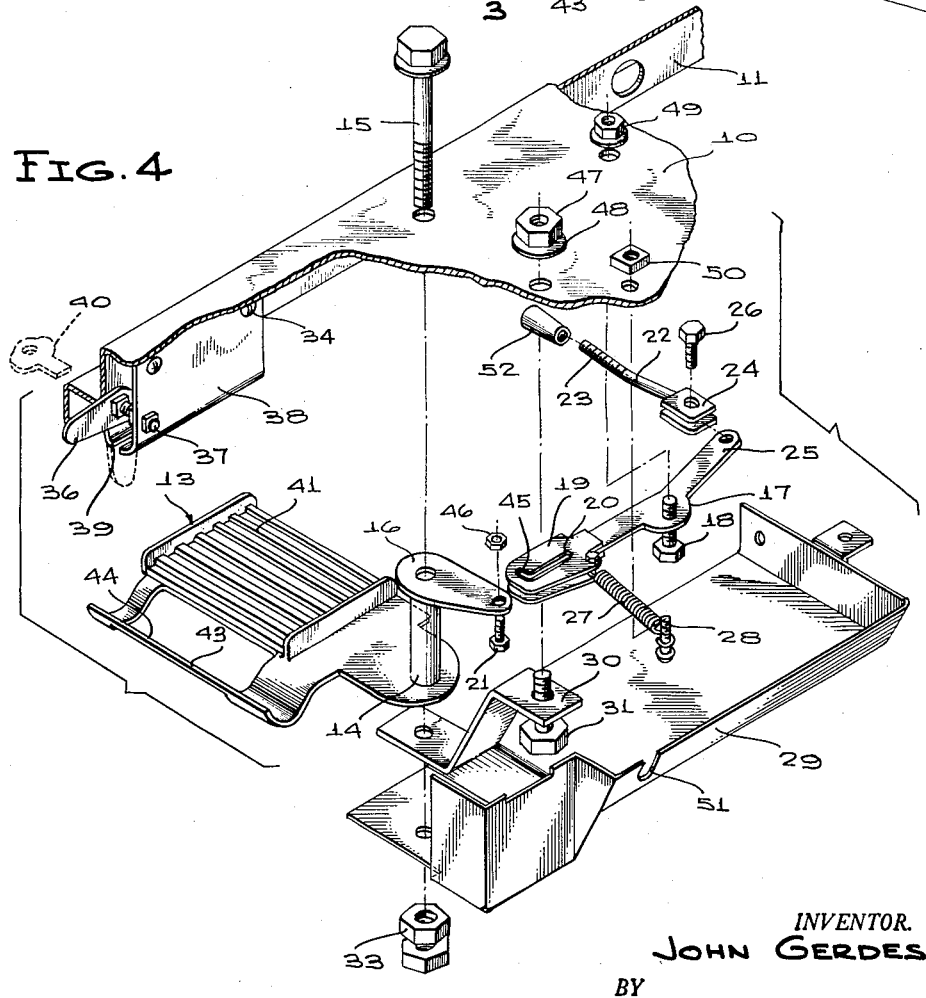
INVENTOR.
JOHN GERDES
BY
McMorrow, Berman + Davidson
ATTORNEYS July 17, 1956  J. GERDES  2,755,102
FOOT SCRAPER FOR A VEHICLE
Filed July 8, 1955  2 Sheets-Sheet 2
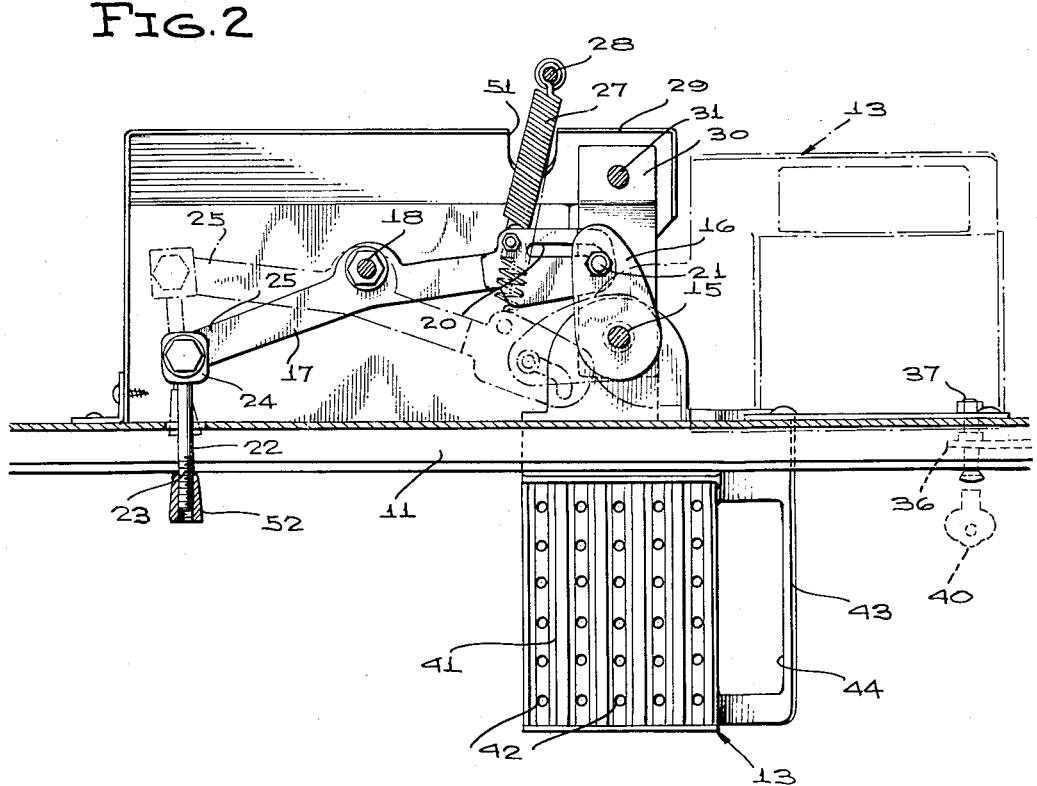
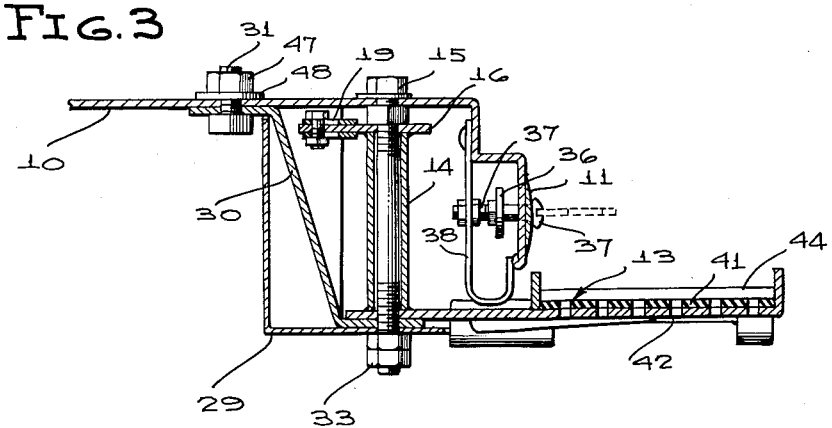
INVENTOR.
JOHN GERDES
BY
McMorrow, Berman + Davidson
ATTORNEYS

2,755,102
FOOT SCRAPER FOR A VEHICLE

John Gerdes, Rochester, N. H.

Application July 8, 1955, Serial No. 520,763

3 Claims. (Cl. 280—164)

The present invention relates to a foot scraper.

An object of the present invention is to provide a foot scraper for attachment to a vehicle so that mud or snow may be scraped from an individual's foot before entrance into the vehicle.

Another object of the present invention is to provide a foot scraper having automatically operating cleaning means so that mud or snow cannot accumulate thereon.

A further object of the present invention is to provide a foot scraper for attachment to a vehicle in such a way as to be automatically extended into a position for use when the vehicle door is opened and may be locked in a non-use position when there are periods of fair or dry weather.

These and other objects and advantages of the present invention will be fully apparent from the following description when taken in connection with the annexed drawings, in which:

Figure 1 is an isometric view showing a portion of a vehicle with the present invention installed thereon, Figure 2 is a vertical view on the line 2—2 of Figure 1, Figure 3 is an end view in cross-section on the line 3—3 of Figure 1, and Figure 4 is an exploded view of the components of the present invention.

Referring in greater detail to the drawings in which like numerals indicate like parts throughout the several views, the foot scraper of the present invention is for use with a vehicle indicated generally by the reference numeral 9, the vehicle including a floor panel 10, a frame member 11 adjacent the floor panel, and a door 12 adapted to swing toward the floor panel as it closes and comprises a scraper blade 13 positioned on one side of the floor panel 10 and projecting perpendicularly outwardly from the frame member 11. An upstanding hollow post 14 is secured to the blade 13 adjacent one end of the latter. A vertically extending anchoring pin or bolt 15 extends through the floor panel 10 and the hollow post 14 and forms a pivot about which the blade 13 is swingable in a horizontal plane from the projecting position with respect to the frame member 11 to a parallel position wholly beneath the floor panel, the latter position being shown in dotted lines in Figure 2.

A rocker arm 16 is secured to the upper end of the post 14 and extends away from the blade 13. A lever 17 is disposed beneath the floor panel 10 inwardly of and spaced from the frame member 11 and is connected intermediately of its ends to the floor panel by a vertically disposed pivot pin or bolt 18 spaced from the anchoring pin or bolt 15 for swinging movement about the bolt 18 as an axis. One end 19 of the lever 17 is bifurcated and formed with an L-shaped slot 20 which receives the bolt 21 and operatively connects the lever one end 19 to the arm 16 for effecting movement of the blade 13.

An operating arm 22 projects by one end 23 through a hole provided in the frame member in the path of travel of the lower edge of the door 12 adjacent the point of its hinged connection with the vehicle 9 and has its other end 24 bifurcated and pivotally connected to the other end 25 of the lever 17, there being a bolt 26 extending through aligned holes in the lever end 25 and the operating arm end 24. A spring 27 has one end anchored to a bolt 28 and the other end connected to the lever 17 adjacent and spaced from the end 19 of the latter, and urges the blade 13 to its projecting position and, simultaneously, urges the end 23 of the operating arm outwardly to a position where it will be abuttingly engaged by the door 12 as the latter executes its closing movement.

A protective cover 29 underlies the lever 17 and has a slot for the spring 27, the bolt 28 on the one end of the spring 27 extending through a hole in the floor panel 10 exteriorly of the protective cover 29.

Within the protective cover 29 is an angle bracket 30 having its upper end secured to the floor panel by a bolt 31 and its lower end interposed between the lower end of the post 14 and the protective cover 29 and having a hole 32 for the bolt 15, the nuts 33 on the bolt 15 securing this portion of the assembly together.

Means is provided for locking the blade in a non-use position beneath the floor panel. Specifically, such means comprises an arm 36, shown in full lines in Figure 4 in an unlocked position, fixedly secured to a horizontally-disposed pivot pin 37 intermediate the ends of the latter. The pivot pin 37 has one end journaled in a hole in a U-shaped bracket 38 secured by bolts 34 to the inner face of the frame member 11 and has its other end provided with a kerf or slot 35, the other end of the pivot pin 37 projecting outwardly through a hole in the frame member 11. The bracket 38 is provided with a slot on its lower end through which the arm 36 projects when the arm 36 is in the position shown in dotted lines in Figure 4, in which position the blade 13 is prevented from swinging outwardly when the door is opened. A key 40, shown in dotted lines in Figures 2 and 4, is provided for engagement in the slot 35 in the one end of the pivot pin 37 for manually turning the pin between the locked and unlocked positions. Other means such as a coin or screwdriver may be used to turn the pivot pin 37.

The bracket 38 also serves to clean the upper surface of any snow, mud, or dirt which might accumulate thereon as a result of an individual scraping his foot upon the blade, the lower end of the bracket 38 rubbing the top of the blade 13 when the blade 13 is moved from the projecting position shown in full lines in Figure 2 to the parallel position shown in dotted lines in that figure.

The upper surface of the blade 13 is provided with rubber ribs 41 between which are drainage holes 42, and the blade 13 may be used as a step when so desired, the angle bracket 30 serving to brace the blade when so used. The scraping edge 43 of the blade 13 facing the individual as he starts to enter the vehicle is bent in the form of a half cylinder with an opening 44 for the disposal of mud or snow scraped free from the sole of a shoe by the edge 43. The installation of the assembly of the present invention on a vehicle is simple and accomplished by drilling only four holes in the floor panel and a pair of holes in the frame member.

The assembly includes inserting the bolt 21 through the hole in the arm 16 and the slot 20 in the lever end 19, the short leg 45 of the slot 20 receiving the bolt 21 when the plate is in the fully-projected position and serving to steady the blade against any forward or backward movement when frictionally engaged by an individual's foot. A nut 46 secures the bolt 21 in place. A nut 47 and washer 48 secure the bolt 31 in place, and another washer assembly 49 secures the bolt 18, together with a nut 50 securing the bolt 28. The slot in the protective cover 29 is indicated in Figure 2 and in Figure 4 by the reference numeral 51. A rubber tip 52 on the end 23 of the operating arm 22 protects the finish of the door and quiets the abutting engagement of the door with the operating arm.

In use, the scraper blade will be automatically extended to the projected position exteriorly of the vehicle when the door is open and will be automatically withdrawn to the position beneath the vehicle floor panel when the door is closed. When it is not desired to have the scraper blade project, turning the pivot pin 37 to a position at which the arm 36 projects downwardly into engagement with the scraper blade will prevent the scraper blade from being projected whenever the door is open.

What is claimed is:

1. The combination with a vehicle including a floor panel, and an openable and closable door swingable toward said panel upon closing movement of said door, of a foot scraper comprising a vertically disposed anchoring pin carried by said panel, a scraper blade positioned so as to project perpendicularly from a side of said panel and connected to said pin for movement from the projecting position to a position wholly beneath said panel, a vertically disposed pivot pin spaced from said anchoring pin and carried by said panel, a lever disposed beneath said floor panel connected intermediate its ends to said pivot pin for swinging movement about said pivot pin as an axis, one end of said lever being connected to said scraper blade for movement therewith, and an operating arm pivotally connected to the other end of said lever, said arm being positioned in the path of travel of said door and engageable therewith upon execution of closing movement of said door.

2. The combination with a vehicle including a floor panel, and an openable and closable door swingable toward said panel upon closing movement of said door, of a foot scraper comprising a vertically disposed anchoring pin carried by said panel, a scraper blade positioned so as to project perpendicularly from a side of said panel and connected to said pin for movement from the projecting position to a position wholly beneath said panel, a vertically disposed pivot pin spaced from said anchoring pin and carried by said panel, a lever disposed beneath said floor panel connected intermediate its ends to said pivot pin for swinging movement about said pivot pin as an axis, one end of said lever being connected to said scraper blade for movement therewith, an operating arm pivotally connected to the other end of said lever, said arm being positioned in the path of travel of said door and engageable therewith upon execution of closing movement of said door, and spring means urging said blade to the projecting position.

3. The combination with a vehicle including a floor panel, and an openable and closable door swingable toward said panel upon closing movement of said door, of a foot scraper comprising a vertically disposed anchoring pin carried by said panel, a hollow post mounted on said pin for movement about said pin as an axis, a scraper blade positioned so as to project perpendicularly from a side of said panel fixedly secured to said post at the lower end of the latter and on one side thereof so as to move from the projecting position to a position wholly beneath said panel upon execution of movement of said post, a rocker arm fixedly secured to said post on the upper end of the latter, a vertically disposed pivot pin spaced from said anchoring pin and carried by said panel, a lever disposed beneath said floor panel and connected intermediate its ends to said pivot pin for swinging movement about said pivot pin as an axis, one end of said lever being connected to said rocker arm for movement therewith, an operating arm pivotally connected to the other end of said lever, said arm being positioned in the path of travel of said door and engageable therewith upon execution of closing movement of said door, means for locking said blade in the position wholly beneath said panel, and spring means urging said blade to the projecting position.

References Cited in the file of this patent

UNITED STATES PATENTS

| 2,296,629 | Coppock | Sept. 22, 1942 |
| 2,583,894 | Shuck | Jan. 29, 1952 |

FOREIGN PATENTS

| 829,217 | France | Mar. 21, 1938 |
| 1,077,065 | France | Apr. 28, 1954 |